(12) United States Patent
Haruna

(10) Patent No.: US 6,604,738 B2
(45) Date of Patent: Aug. 12, 2003

(54) CLAMPING APPARATUS WITH DATUM FUNCTION

(75) Inventor: Yosuke Haruna, Kobe (JP)

(73) Assignee: Kabushiki Kaisha Kosmek, Hyogo (JP)

( * ) Notice: Subject to any disclaimer, the term of this patent is extended or adjusted under 35 U.S.C. 154(b) by 0 days.

(21) Appl. No.: 10/163,274

(22) Filed: Jun. 4, 2002

(65) Prior Publication Data

US 2002/0185802 A1 Dec. 12, 2002

(30) Foreign Application Priority Data

Jun. 7, 2001 (JP) .................... P 2001-172070

(51) Int. Cl.$^7$ ................................ B23Q 3/00
(52) U.S. Cl. ....................................... 269/309
(58) Field of Search ................... 269/309–310

(56) References Cited

U.S. PATENT DOCUMENTS

| 4,577,847 A | 3/1986 | Schedwin |
| 4,833,760 A | 5/1989 | Sundstrom |
| 5,810,344 A | 9/1998 | Nishimoto |
| 6,024,354 A | 2/2000 | Yonezawa |
| 6,073,325 A | 6/2000 | Stark |
| 6,095,509 A | 8/2000 | Yonezawa |
| 6,139,002 A | 10/2000 | Stark |
| 6,152,436 A | 11/2000 | Sonderegger et al. |
| 6,161,826 A | 12/2000 | Forrer |
| 6,527,266 B1 * | 3/2003 | Yonezawa et al. .......... 269/309 |

FOREIGN PATENT DOCUMENTS

| EP | 1 078 713 A1 | 2/2001 |
| JP | 7-314270 A | 12/1995 |
| JP | 8-155770 A | 6/1996 |
| JP | 11-10468 A | 1/1999 |

OTHER PUBLICATIONS

U.S. patent application No. 09/631,670 (now US patent No. 6,527,266).

* cited by examiner

Primary Examiner—Robert C. Watson
(74) Attorney, Agent, or Firm—Akin, Gump, Strauss, Hauer & Feld, L.L.P.

(57) ABSTRACT

A work pallet (3) has an under surface opened to provide a positioning hole (12). The positioning hole (12) has an upper wall which supports a pull rod (13) diametrically movably. A clamp pallet (2) projects an annular plug portion (21), onto which a shuttle member (23) is externally fitted. The shuttle member (23) makes a tapering engagement with the positioning hole (12). The plug portion (21) has a cylindrical hole (21a), into which a transmission sleeve (31) is inserted. The transmission sleeve (31) supports an engaging ball (34), which engages with an engaged portion (13b) of the pull rod (13). Defined between the cylindrical hole (21a) and an outer peripheral surface (31b) of the transmission sleeve (31) is a flow passage (43) through which cleaning compressed air passes.

11 Claims, 4 Drawing Sheets

CLAMPING APPARATUS WITH DATUM FUNCTION

BACKGROUND OF THE INVENTION

1. Field of the Invention

The present invention relates to a clamping apparatus with a datum function and more particularly to an apparatus for accurately aligning a work pallet or the like movable member with a reference member such as a table of a machining center and fixing it thereto in such an accurately aligned state.

2. Explanation of Related Art

There is a conventional example of the clamping apparatus of this kind disclosed in Japanese Patent Public Disclosure No. 11-10468. The conventional technique is constructed as follows.

A reference member has a supporting surface formed with a fitting straight hole. A retracting nipple fixed to a movable member has a flange fitted into the straight hole. Thus the straight hole has an axis made coincident with an axis of the nipple. Thereafter, the retracting nipple is pulled, thereby fixing the movable member to the reference member.

However, the conventional technique has the following problem.

In order to smoothly attach the movable member to the reference member, it is required to provide a diametrical fitting gap between the fitting straight hole and the flange. The existence of the fitting gap decreases the aligning accuracy of the both members.

SUMMARY OF THE INVENTION

The present invention aims at making it possible to smoothly attach the movable member to the reference member and to accurately align the both members with each other.

In order to accomplish the above aim, the present invention has constructed a clamping apparatus in the following manner, for example, as shown in FIGS. 1 to 3 or in FIG. 4.

The clamping apparatus aligns a movable member (M) with a reference member (R) and fixes a supported surface (T) of the movable member (M) to a supporting surface (S) of the reference member (R). The supported surface (T) of the movable member (M) is opened to provide a positioning hole 12, within which the movable member (M) is provided with a pull rod 13 substantially coaxially with the positioning hole 12. The reference member (R) projects an annular plug portion 21 which is inserted into an annular space defined between the positioning hole 12 and the pull rod 13. Arranged between the plug portion 21 and the positioning hole 12 is a shuttle member 23 which diametrically expands and contracts. The shuttle member 23 is supported by one of the plug portion 21 and the positioning hole 12 axially movably within a predetermined range and is able to make a tapering engagement with the other. The shuttle member 23 has a tapered surface 28 which is formed so that it narrows toward an inner portion of the positioning hole 12. The shuttle member 23 is urged by a resilient member 24 in such a direction that the tapering engagement is made tightly. The plug portion 21 has a cylindrical hole 21a, into which a transmission sleeve 31 is axially movably inserted. The transmission sleeve 31 has a cylindrical hole 31a which can receive an engaged portion 13b of the pull rod 13. The engaged portion 13b engages with and disengages from an engaging member 34, which is supported by the transmission sleeve 31. The reference member (R) is provided with a supply port 41 for cleaning fluid. A flow passage 43, 45 is formed in at least one of a space defined between the cylindrical hole 21a of the plug portion 21 and an outer peripheral surface 31b of the transmission sleeve 31, and a space inside the cylindrical hole 31a of the transmission sleeve 31. The flow passage 43, 45 communicates with the supply port 41.

The present invention operates, for example, in the following manner.

When clamping the movable member to the reference member, first, the movable member automatically makes an aligning movement owing to a guiding action of the tapered surface of the shuttle member. Then the positioning hole of the movable member has its axis made accurately coincident with an axis of the plug portion of the reference member. Next, the shuttle member compresses the resilient member and it moves axially. The movable member has its supported surface received by the supporting surface of the reference member and the shuttle member is closely attached to the positioning hole and the plug portion. Thus the movable member is constrained via the shuttle member by the plug portion as well as by the supporting surface. As a result, the transmission sleeve pulls the movable member through the engaging member and the pull rod, thereby allowing the movable member to be precisely and strongly positioned and fixed to the reference member.

According to the present invention, the tapered surface of the shuttle member can make an aligning guide of the movable member, so that the movable member can be smoothly attached to the reference member. Further, differently from the above-mentioned prior art, the present invention can remove the diametrical fitting gap defined between the members to be connected. This makes it possible to align the reference member with the movable member with a high accuracy. Besides, cleaning fluid discharged from the foregoing flow passage can clean an engaging gap and a contact gap formed between the reference member and the movable member, which results in the possibility of preventing a misengagement between the both members.

The present invention includes the following clamping apparatus.

For instance, as shown in FIGS. 1 to 3, the shuttle member 23 has an inner peripheral surface formed by a straight surface 27 and has an outer peripheral surface defined by the tapered surface 28. The straight surface 27 is supported by the plug portion 21 axially movably. The tapered surface 28 makes a tapering engagement with the positioning hole 12. On an outer periphery of the plug portion 21, the reference member (R) is formed with an annular attaching groove 29, into which the resilient member 24 is inserted and the shuttle member 23 has its base portion fitted.

According to this invention, the reference member is equipped with the shuttle member. Therefore, in the case where a number of movable members are attached to and detached from one reference member, the equipped shuttle members are reduced in number to result in the possibility of forming a clamping system simply. In addition, the resilient member is inserted into the attaching groove and the shuttle member has its base portion fitted thereinto. This can prevent chips or the like foreign matters from invading the attaching groove. Accordingly, the shuttle member can smoothly operate over a long period of time.

The present invention further includes the following clamping apparatus.

The supply port 41 for cleaning fluid communicates with the attaching groove 29. According to this invention, even if chips or the like foreign matters have invaded the attaching groove, the cleaning fluid can clean out the foreign matters. Therefore, the shuttle member can smoothly operate over a longer period of time.

The present invention still further includes the following clamping apparatus.

For example, as shown in FIG. 2, when driving the transmission sleeve 31 for unclamping, a leading end of the transmission sleeve 31 pushes at least one of the pull rod 13 and a top wall 12a of the positioning hole 12. This forms an engaging gap ($\alpha$) on the tapered surface 28 of the shuttle member 23 and defines a contact gap ($\beta$) between the supporting surface (S) and the supported surface (T). This invention can offer an advantage that the movable member can be easily removed from the reference member owing to the existence of the engaging gap and the contact gap.

The present invention also includes the following clamping apparatus.

The pull rod 13 is supported by the movable member (M) diametrically movably within a predetermined range. In this case, when attaching the movable member to the reference member, even if the axis of the plug portion somewhat misaligns with the axis of the positioning hole, this misalignment can be absorbed by a diametrical movement of the pull rod made through an insertion resistance produced when the pull rod is inserted into the cylindrical hole of the transmission sleeve. This enables the pull rod to be smoothly inserted into the cylindrical hole of the transmission sleeve. As a result, the tapered surface of the shuttle member can smoothly make the aligning guide of the movable member.

Moreover, in order to accomplish the above object, the present invention has constructed a clamping apparatus in the following manner, for example, as shown in FIGS. 1 to 3 or in FIG. 4.

The clamping apparatus aligns a movable member (M) with a reference member (R) and fixes a supported surface (T) of the movable member (M) to a supporting surface (S) of the reference member (R). The supported surface (T) of the movable member (M) is opened to provide a positioning hole 12, within which a pull rod 13 is supported by the movable member (M) diametrically movably within a predetermined range. The reference member (R) projects an annular plug portion 21 which is inserted into an annular space defined between the positioning hole 12 and the pull rod 13. Arranged between the plug portion 21 and the positioning hole 12 is a shuttle member 23 which diametrically expands and contracts. This shuttle member 23 is supported by one of the plug portion 21 and the positioning hole 12 axially movably within a predetermined range and can make a tapering engagement with the other. The shuttle member 23 has a tapered surface 28 which is formed so that it narrows toward an inner portion of the positioning hole 12. The shuttle member 23 is urged by a resilient member 24 in such a direction that the tapering engagement is made tightly. The plug portion 21 has a cylindrical hole 21a into which a transmission sleeve 31 is axially movably inserted. The transmission sleeve 31 has a cylindrical hole 31a which can receive an engaged portion 13b of the pull rod 13. The engaged portion 13b engages with and disengages from an engaging member 34, which is supported by the transmission sleeve 31.

The foregoing invention operates, for example, in the following manner.

When clamping the movable member to the reference member, even if the axis of the plug portion somewhat misaligns with the axis of the positioning hole, this misalignment can be absorbed by the diametrical movement of the pull rod made through the insertion resistance produced when the pull rod is inserted into the cylindrical hole of the transmission sleeve. This enables the pull rod to be smoothly inserted into the cylindrical hole of the transmission sleeve. Next, the movable member automatically makes the aligning movement owing to the guiding action of the tapered surface of the shuttle member. Thus the positioning hole of the movable member has its axis made precisely coincident with the axis of the plug portion of the reference member. Subsequently, the shuttle member compresses the resilient member and it moves axially. The movable member has its supported surface received by the supporting surface of the reference member and the shuttle member is closely attached to the positioning hole and the plug portion. This constrains the movable member via the shuttle member by the plug portion as well as by the supporting surface. As a result, the transmission sleeve pulls the movable member through the engaging member and the pull rod, thereby allowing the movable member to be precisely and strongly positioned and fixed to the reference member.

According to the foregoing invention, the diametrical movement of the pull rod absorbs the misalignment and the tapered surface of the shuttle member can make the aligning guide of the movable member. Therefore, the movable member can be smoothly attached to the reference member. Further, differently from the prior art, the present invention can rid the diametrical fitting gap between the members to be connected, which results in the possibility of aligning the reference member with the movable member with a high accuracy.

BRIEF DESCRIPTION OF THE DRAWINGS

FIG. 1 is a sectional view in elevation of a clamping apparatus in a state where its movable member starts an attachment to its reference member;

FIG. 2 shows a state when the movable member has completed the attachment to the reference member and is a view similar to FIG. 1;

FIG. 3 shows a state where the movable member has been fixed to the reference member and is a view similar to FIG. 1.

DESCRIPTION OF THE PREFERRED EMBODIMENTS

Figure 1:
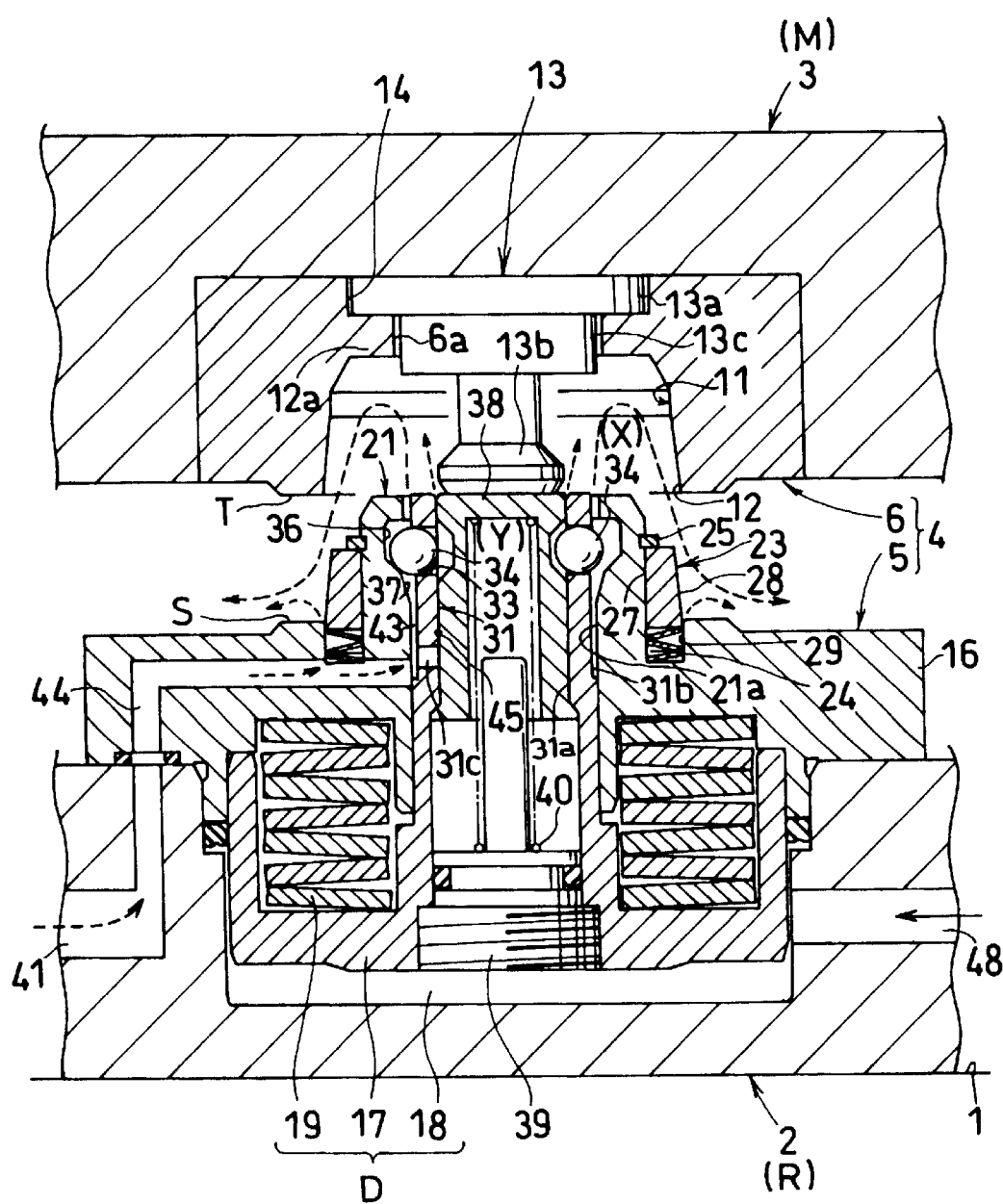
FIGS. 1 to 3 show a first embodiment of the present invention.
Figure 2:
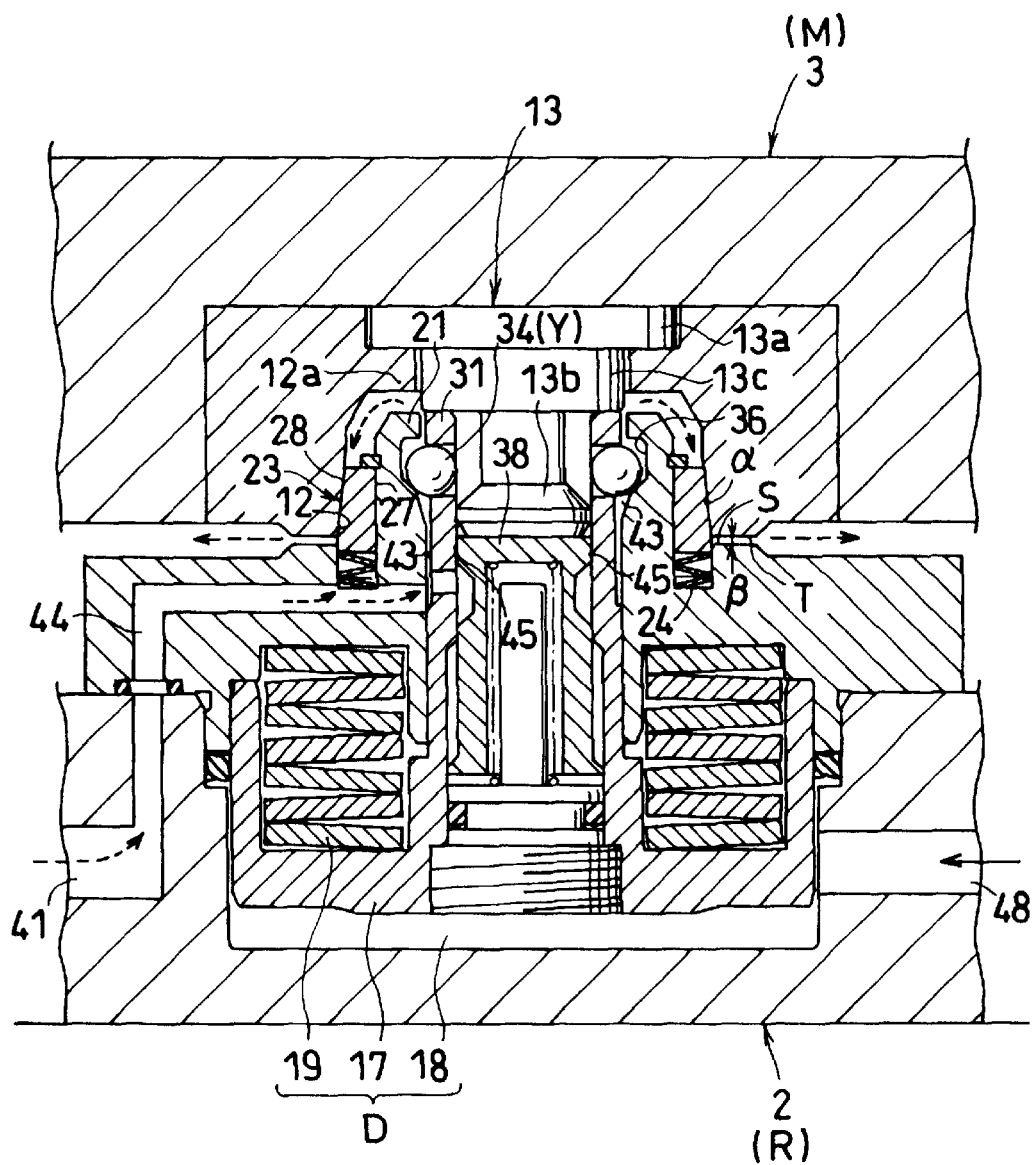
Figure 3:
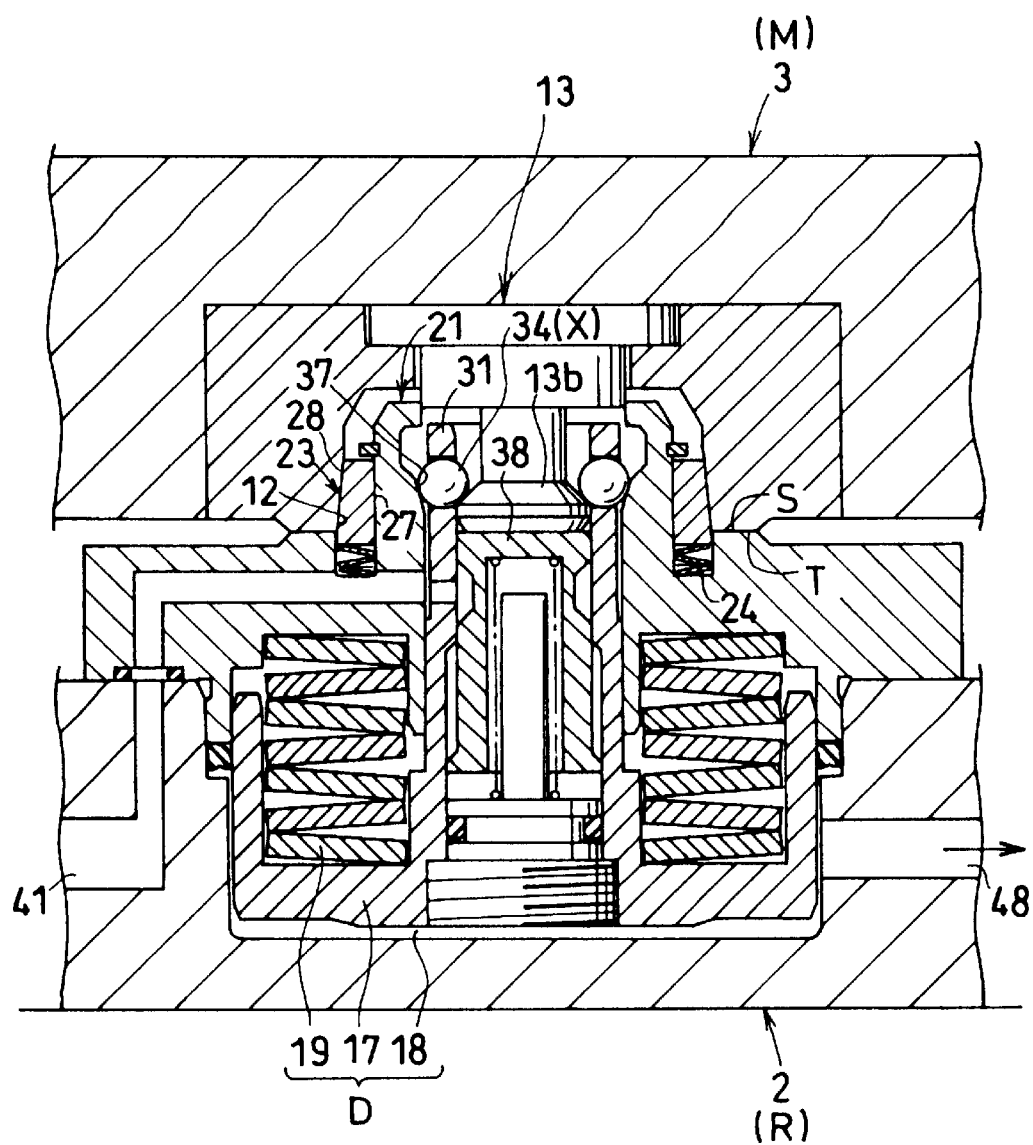

FIGS. 1 to 3 show a first embodiment of the present invention. First, explanation is given for a structure of a clamping apparatus according to the present invention by resorting to FIG. 1.

A table 1 of a machining center has an upper surface to which a clamp pallet 2 of a reference member (R) is fixed. A work pallet 3 of a movable member (M) is fixed to the clamp pallet 2 through a plurality of clamping apparatuses 4 each having a datum function. Here, only one of the clamping apparatuses 4 is illustrated. Besides, the work pallet 3 has an upper surface which a plurality of workpieces can be attached to and detached from through a large number of work clamps, although not shown.

The clamping apparatus 4 comprises a datum clamp 5 fixed to the clamp pallet 2 through a plurality of bolts (not shown) and a datum ring 6 fixed to the work pallet 3 through a plurality of bolts (not shown).

The datum ring 6 has an under surface formed with a supported surface (T). The supported surface (T) is opened to provide a socket bore 11. The socket bore 11 has a lower half portion formed with a tapered positioning hole 12 so that it narrows upwards.

Further, a pull rod 13 is arranged within the positioning hole 12. The pull rod 13 is arranged substantially coaxially with the positioning hole 12 and is supported by the work pallet 3 diametrically movably within a predetermined range. More specifically, the datum ring 6 has an upper surface formed with an accommodating groove 14 circular when seen in plan. The pull rod 13 has an upper portion provided with a larger-diameter portion 13a, which is inserted into the accommodating groove 14 with a predetermined gap diametrically interposed therebetween. The larger-diameter portion 13a has an under surface with which a flange portion 6a of the datum ring 6 is brought into a light contact.

The datum clamp 5 comprises a cover block 16 fixed to the clamp pallet 2, a piston 17 hermetically inserted into a space defined between the cover block 16 and the clamp pallet 2, a hydraulic chamber 18 formed below the piston 17, and a clamp spring 19 attached between the piston 17 and the cover block 16. Here, the clamp spring 19 is formed from a plurality of coned disk springs vertically overlaid one on another, but it may be a compression coil spring.

A driving means (D) of the clamping apparatus 4 is composed of the piston 17, the hydraulic chamber 18 and the clamp spring 19.

The cover bock 16 projects an annular plug portion 21 upwards from its mid portion. The plug portion 21 is inserted into the positioning hole 12. The cover block 16 projects itself upwards a little at a lower portion and on an outer periphery of the plug portion 21 to form an annular projection. The annular projection has an upper surface which defines a supporting surface (S).

An annular shuttle member 23 is externally fitted onto the plug portion 21. The shuttle member 23 is urged upwards by three coned disk springs (resilient member) 24 and is received by a snap ring 25.

More specifically, the annular shuttle member 23 has an inner peripheral surface formed by a straight surface 27 and an outer peripheral surface defined by a tapered surface 28. The shuttle member 23 has an annular wall provided with a slit or has the inner peripheral surface provided with a groove (either of which is not shown), thereby allowing the tapered surface 28 and the straight surface 27 to diametrically expand and contract. Further, the straight surface 27 is supported by an outer peripheral surface of the plug portion 21 axially movably. The tapered surface 28 is formed so that it narrows upwards in order to make a tapering engagement with the tapered positioning hole 12. Besides, on the outer periphery of the plug portion 21, the cover block 16 is formed with an annular attaching groove 29. The coned disk springs 24 are inserted into the attaching groove 29 and the shuttle member 23 has its lower portion fitted thereinto.

The plug portion 21 has a cylindrical hole 21a into which a transmission sleeve 31 is axially movably inserted. The transmission sleeve 31 is formed with a plurality of through holes 33 spaced peripherally at a predetermined interval. The respective through holes 33 support engaging balls (engaging members) 34 so that they can move between a radially inward engaging position (X) (see a right half view in FIG. 1) and a radially outward disengaging position (Y) (see a left half view in FIG. 1).

The cylindrical hole 21a of the plug portion 21 has a retreating groove 36 and a slant pushing surface 37 vertically continued with each other, in correspondence with the respective balls 34.

The transmission sleeve 31 has a cylindrical hole 31a into which a closure member 38 is vertically movably inserted. An advance spring 40 is attached between the closure member 38 and a spring retainer 39. The advance spring 40 pushes the closure member 38 upwards. The closure member 38 has a lower end received by a shoulder portion of the cylindrical hole 31a. This positions an upper end surface of the closure member 38 at substantially the same height as that of an upper end surface of the transmission sleeve 31.

In addition, there is provided a means which cleans fitting surfaces of the clamping apparatus 4.

More specifically, the clamp pallet 2 is provided with a supply port 41 for compressed air (cleaning fluid). Further, defined between the cylindrical hole 21a of the plug portion 21 and an outer peripheral surface 31b of the transmission sleeve 31 is a first flow passage 43. This first flow passage 43 communicates with the supply port 41 through a communication hole 44. Further, formed between the cylindrical hole 31a of the transmission sleeve 31 and an outer peripheral surface of the closure member 38 is a second flow passage 45. This second flow passage 45 communicates with the communication hole 44 via a through hole 31c of the transmission sleeve 31. Besides, the communication hole 44 has a halfway portion communicated with the attaching groove 29 as well.

The clamping apparatus 4 operates in the following manner as shown in FIGS. 1 to 3.

FIG. 1 shows a state where the work pallet 3 starts its attachment to the clamp pallet 2. FIG. 2 shows a state when the work pallet 3 has completed its attachment to the clamp pallet 2. FIG. 3 shows a state where the work pallet 3 has been fixed to the clamp pallet 2.

In the state of FIG. 1, pressurized oil is supplied to the hydraulic chamber 18 via a pressurized oil supply and discharge passage 48. Thus the piston 17 raises the transmission sleeve 31 against the clamp spring 19 with oil pressure of the hydraulic chamber 18, thereby allowing each of the balls 34 to face the retreating groove 36 in a free condition. Here, the closure member 38 is raised by the advance spring 40. Every ball 34 is freely movable between the disengaging position (Y) and the engaging position (X). Further, the shuttle member 23 is retained at a raised position by the coned disk springs 24.

And as shown in FIG. 1, when the work pallet 3 starts descending with respect to the clamp pallet 2, compressed air for cleaning is supplied to the supply port 41. Then while the compressed air passes through the first flow passage 43, it cleans the slant pushing surface 37 and the engaging balls 34. Next, the compressed air is vigorously discharged from an upper end of the first flow passage 43 and the discharged compressed air cleans the engaged portion 13b of the pull rod 13 as well as a top surface and a peripheral surface of the socket bore 11. Subsequently, it cleans the tapered surface 28 of the shuttle member 23 and then is horizontally discharged. Further, compressed air is supplied to the second flow passage 45 consisting of the fitting gap. It cleans the fitting gap and the engaging balls 34 and then is discharged from an upper end of the second flow passage 45. The discharged compressed air cleans a lower peripheral surface of the engaged portion 13b. Additionally, compressed air is supplied to the attaching groove 29. It cleans a fitting gap of the straight surface 27 of the shuttle member 23 and a fitting gap at a lower portion of the tapered surface 28 and then is discharged to an exterior area.

When the work pallet 3 further descends, the pull rod 13 invades the cylindrical hole 31a of the transmission sleeve 31 to lower the closure member 38 and the tapered positioning hole 12 is guided by the tapered surface 28 of the shuttle member 23. Subsequently, as shown in FIG. 2, the pull rod 13 has a flange portion 13c, which is provided at its halfway portion, brought into contact with the upper end surface of the transmission sleeve 31. And the transmission sleeve 31 receives the work pallet 3. In this receiving state, there is defined an engaging gap (α) between the tapered surface 28 of the shuttle member 23 and the tapered positioning hole 12. At the same time, there is formed a contact gap (β) between the supporting surface (S) and the supported surface (T). In this state, the compressed air discharged from the upper end of the first flow passage 43 vigorously cleans the engaging gap (α) and the contact gap (β) and then is discharged to the exterior area.

In a state shown by FIG. 2, when the pressurized oil of the hydraulic chamber 18 is discharged from the supply and discharge passage 48, the clamp spring 19 strongly lowers the transmission sleeve 31 through the piston 17. Then, first, following the descent of the transmission sleeve 31, the work pallet 3 is moving down due to its own weight. The tapered positioning hole 12 is brought into contact with the tapered surface 28 of the shuttle member 23. This enables the work pallet 3 to slightly compress the coned disk springs 24 through the shuttle member 23 and makes an aligning movement of the tapered positioning hole 12 to have its axis made coincident with the axis of the plug portion 21.

Substantially at the same time, as shown in FIG. 3, the pushing surface 37 of the plug portion 21 pushes every ball 34 to the engaging position (X) and the pushing force strongly lowers the work pallet 3 through the pull rod 13. Then the tapered positioning hole 12 makes a strong tapering engagement with the tapered surface 28 of the shuttle member 23 and it moves while aligning. Then the tapered positioning hole 12 has its axis made precisely coincident with the axis of the plug portion 21. The shuttle member 23 further descends against the coned disk springs 24 and the supported surface (T) is received by the supporting surface (S). This allows the work pallet 3 to be horizontally constrained by the plug portion 21 through the shuttle member 23 which the tapered positioning hole 12 has diametrically contracted, and to be vertically constrained by the supporting surface (S). As a result, the work pallet 3 is accurately and strongly positioned and fixed to the clamp pallet 2.

In the above case, the pushing surface 37 is slanted as illustrated. Therefore, a driving force of the transmission sleeve 31 can be multiplicably converted and transmitted to the pull rod 13. This makes it possible to strongly lower the work pallet 3.

After the clamping has been finished as shown in FIG. 3, the contact gap (β) shown in FIG. 2 disappears. This hermetically seals a portion between the supporting surface (S) and the supported surface (T) to thereby remove a way through which the compressed air for cleaning escapes, with the result of increasing a pressure at the supply port 41. This pressure increase is detected by a pressure switch (not shown), thereby making it possible to automatically confirm the completion of the clamping.

When switching over the clamping apparatus from the clamping condition shown in FIG. 3 to the unclamping condition shown in FIG. 2, it is sufficient if pressurized oil is supplied to the hydraulic chamber 18 under the condition of FIG. 3. Then, as shown in FIG. 2, the oil pressure of the hydraulic chamber 18 enables the piston 17 to raise the transmission sleeve 31. This allows each of the balls 34 to face the retreating groove 36 and switch over to the disengaging position (Y). (FIG. 2 shows it has already switched over.) And the transmission sleeve 31 is brought into contact with the flange portion 13c of the pull rod 13 to push up the work pallet 3. Thus, as shown in FIG. 2, the engaging gap (α) is formed on the shuttle member 23 and the contact gap (β) is defined on the supporting surface (S). This enables the work pallet 3 to be easily removed from the clamp pallet 2.

Figure 4:
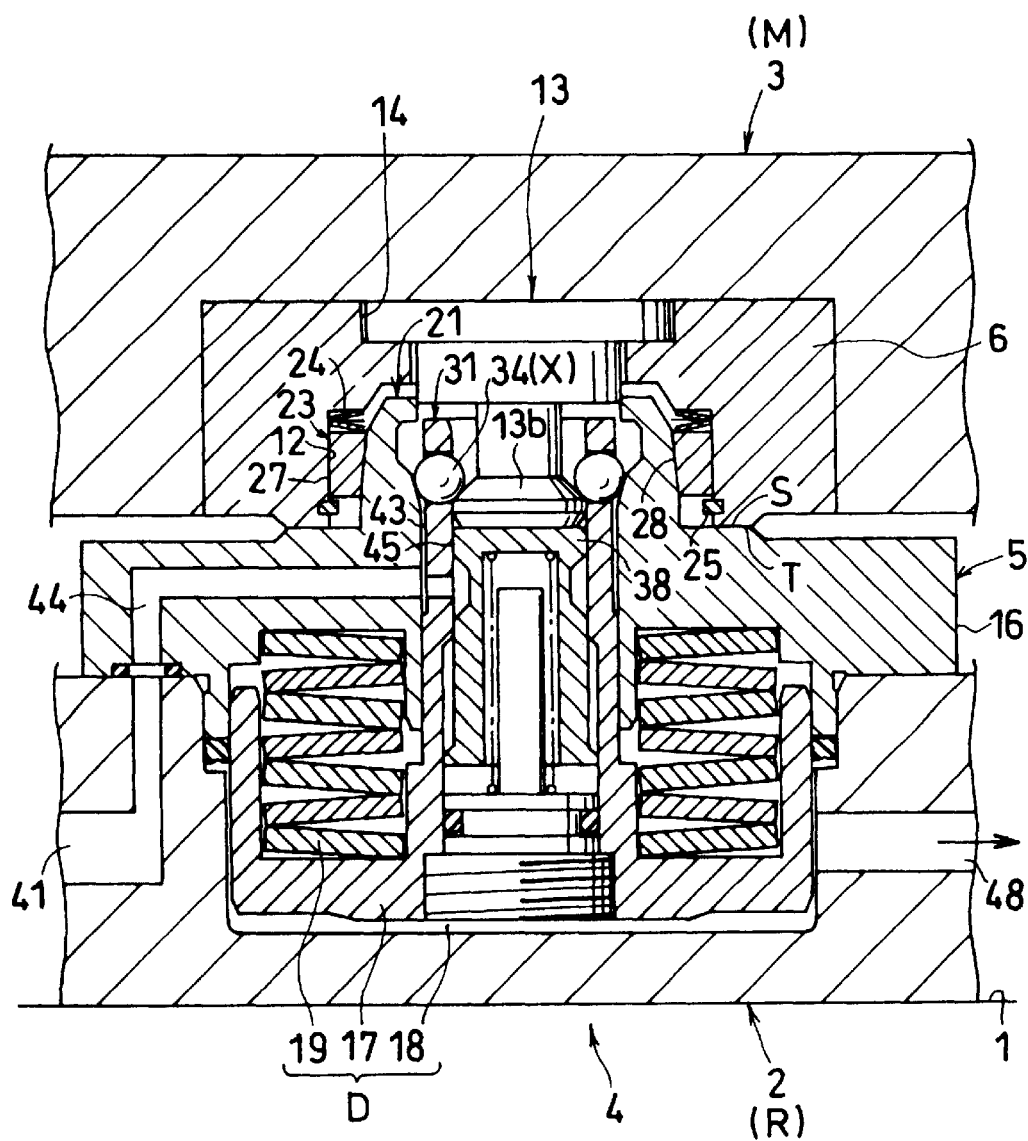
FIG. 4 shows a second embodiment of the clamping apparatus and is a view similar to FIG. 3.

FIG. 4 shows a second embodiment of the present invention and is similar to FIG. 3. In this second embodiment, the same constituent members as those of the first embodiment are, in principle, designated by the same characters. And explanation is given only for a structure different from that of the first embodiment.

The work pallet 3 is provided with the positioning hole 12, which is formed straight. The straight positioning hole 12 vertically movably supports the straight surface 27 on the outer periphery of the shuttle member 23. A plurality of coned disk springs (resilient member) 24 urge the shuttle member 23 downwards. The shuttle member 23 is inhibited from moving down by the snap ring 25 fitted into the lower portion of the positioning hole 12. The shuttle member 23 has its inner peripheral surface formed with the tapered surface 28, which makes a tapering engagement with the outer peripheral surface of the plug portion 21. The tapered surface 28 is formed so that it narrows upwards.

The foregoing respective embodiments can be modified as follows.

The shuttle member 23 of the clamping apparatus is not limited to the exemplified annular body, but it may be formed from a plurality of divided segments arranged annularly. The shuttle member 23 may be pushed by a resilient member of a compression coil spring or the like springs of other kinds instead of the exemplified coned disk spring 24. Additionally, it may consist of rubber or the like.

Further, as for the engaging member 34 of the clamping apparatus, a hook, a collet or the like may be employed instead of the exemplified ball. The clamping apparatus can be driven for clamping by a fluid pressure such as an oil pressure and an air pressure instead of the spring force.

When unclamping the clamping apparatus, the transmission sleeve 31 has its upper end surface brought into contact with the flange portion 13c of the pull rod 13 to raise the work pallet 3. Instead, the transmission sleeve 31 may have its upper end surface brought into contact with the top wall 12a of the positioning hole 12 (top wall of the socket bore 11). And the pull rod 13 may be fixed to the work pallet 3 instead of being supported by the work pallet 3 diametrically movably.

The reference member (R) may be tables of the machining center or various sorts of machines instead of the exemplified clamp pallet 2. Further, the movable member (M) may be a workpiece instead of the exemplified work pallet 3. The reference member (R) and the movable member (M) may be arranged in a vertically reversed manner. Besides, they may be connected to each other horizontally or obliquely instead of vertically as exemplified.

A clamping apparatus with a datum function according to the present invention is not limited to the use of clamping the work pallet and the workpiece, but it is a matter of course that it can be utilized for clamping a metal die, an attachment or the like. The clamping apparatus with the datum function may be utilized not only in plural sets but also in a single set.

What is claimed is:

1. A clamping apparatus with a datum function aligning a movable member (M) with a reference member (R) to have a supported surface (T) of the movable member (M) fixed to a supporting surface (S) of the reference member (R), the clamping apparatus comprising:

a positioning hole (12) provided by opening the supported surface (T) of the movable member (M);

a pull rod (13) having an engaged portion (13b) and being connected to the movable member (M) substantially coaxially with the positioning hole (12) within the positioning hole (12);

an annular plug portion (21) having a cylindrical hole (21a) and projecting from the reference member (R) so that it is inserted into an annular space defined between the positioning hole (12) and the pull rod (13);

a shuttle member (23) which has a tapered surface (28) being arranged between the plug portion (21) and the positioning hole (12), and diametrically expanding and contracting, the shuttle member (23) being supported by one of the plug portion (21) and the positioning hole (12) axially movably within a predetermined range and making a tapering engagement with the other, the tapered surface (28) for the tapering engagement being formed so that it narrows toward an inner portion of the positioning hole (12);

a resilient member (24) urging the shuttle member (23) in such a direction that the tapering engagement is made tightly;

a transmission sleeve (31) having a cylindrical hole (31a) and an outer peripheral surface (31b), and being axially movably inserted into the cylindrical hole (21a) of the plug portion (21), the cylindrical hole (31a) of the transmission sleeve (31) receiving the engaged portion (13b) of the pull rod (13);

an engaging member (34) supported by the transmission sleeve (31) so that it engages with and disengages from the engaged portion (13b);

a supply port (41) for cleaning fluid provided in the reference member (R); and a flow passage (43, 45) formed in at least one of a space defined between the cylindrical hole (21a) of the plug portion (21) and the outer peripheral surface (31b) of the transmission sleeve (31), and a space inside the cylindrical hole (31a) of the transmission sleeve (31), the flow passage (43, 45) communicating with the supply port (41).

2. The clamping apparatus as set forth in claim 1, wherein the shuttle member (23) has an inner peripheral surface, an outer peripheral surface and a base portion, the inner peripheral surface being formed by a straight surface (27) and the outer peripheral surface being defined by the tapered surface (28), the straight surface (27) being axially movably supported by the plug portion (21), the tapered surface (28) making a tapering engagement with the positioning hole (12), an annular attaching groove (29) being formed in the reference member (R) on an outer periphery of the plug portion (21), the resilient member (24) being inserted into the attaching groove (29) and the shuttle member (23) having the base portion fitted thereinto.

3. The clamping apparatus as set forth in claim 2, wherein the supply port (41) for cleaning fluid communicates with the attaching groove (29).

4. The clamping apparatus as set forth in claim 1, wherein the transmission sleeve (31) has a leading end and the positioning hole (12) has a top wall (12a), when driving the transmission sleeve (31) for unclamping, the leading end of the transmission sleeve (31) pushing at least one of the pull rod (13) and the top wall (12a) of the positioning hole (12) to thereby form an engaging gap (α) on the tapered surface (28) of the shuttle member (23) and define a contact gap (β) between the supporting surface (S) and the supported surface (T).

5. The clamping apparatus as set forth in claim 1, wherein the movable member (M) supports the pull rod (13) diametrically movably within a predetermined range.

6. A clamping apparatus with a datum function aligning a movable member (M) with a reference member (R) to have a supported surface (T) of the movable member (M) fixed to a supporting surface (S) of the reference member (R), the clamping apparatus comprising:

a positioning hole (12) provided by opening the supported surface (T) of the movable member (M);

a pull rod (13) having an engaged portion (13b) and being supported by the movable member (M) diametrically movably within a predetermined range within the positioning hole (12);

an annular plug portion (21) having a cylindrical hole (21a) and projecting from the reference member (R) so that it is inserted into an annular space defined between the positioning hole (12) and the pull rod (13);

a shuttle member (23) which has a tapered surface (28) being arranged between the plug portion (21) and the positioning hole (12), and diametrically expanding and contracting, the shuttle member (23) being supported by one of the plug portion (21) and the positioning hole (12) axially movably within a predetermined range and making a tapering engagement with the other, the tapered surface (28) for the tapering engagement being formed so that it narrows toward an inner portion of the positioning hole (12);

a resilient member (24) urging the shuttle member (23) in such a direction that the tapering engagement is made tightly;

a transmission sleeve (31) having a cylindrical hole (31a) and being axially movably inserted into the cylindrical hole (21a) of the plug portion (21), the cylindrical hole (31a) of the transmission sleeve (31) receiving the engaged portion (13b) of the pull rod (13); and an engaging member (34) supported by the transmission sleeve (31) so that it engages with and disengages from the engaged portion (13b).

7. The clamping apparatus as set forth in claim 2, wherein the transmission sleeve (31) has a leading end and the positioning hole (12) has a top wall (12a), when driving the transmission sleeve (31) for unclamping, the leading end of the transmission sleeve (31) pushing at least one of the pull rod (13) and the top wall (12a) of the positioning hole (12) to thereby form an engaging gap (α) on the tapered surface (28) of the shuttle member (23) and define a contact gap (β) between the supporting surface (S) and the supported surface (T).

8. The clamping apparatus as set forth in claim 3, wherein the transmission sleeve (31) has a leading end and the positioning hole (12) has a top wall (12a), when driving the transmission sleeve (31) for unclamping, the leading end of the transmission sleeve (31) pushing at least one of the pull rod (13) and the top wall (12a) of the positioning hole (12) to thereby form an engaging gap (α) on the tapered surface (28) of the shuttle member (23) and define a contact gap (β) between the supporting surface (S) and the supported surface (T).

9. The clamping apparatus as set forth in claim 2, wherein the movable member (M) supports the pull rod (13) diametrically movably within a predetermined range.

10. The clamping apparatus as set forth in claim 3, wherein the movable member (M) supports the pull rod (13) diametrically movably within a predetermined range.

11. The clamping apparatus as set forth in claim 4, wherein the movable member (M) supports the pull rod (13) diametrically movably within a predetermined range.

* * * * *